Oct. 22, 1963 T. B. EDWARDS 3,107,643
INFLATABLE WHEEL PONTOONS
Filed June 8, 1962 2 Sheets-Sheet 2

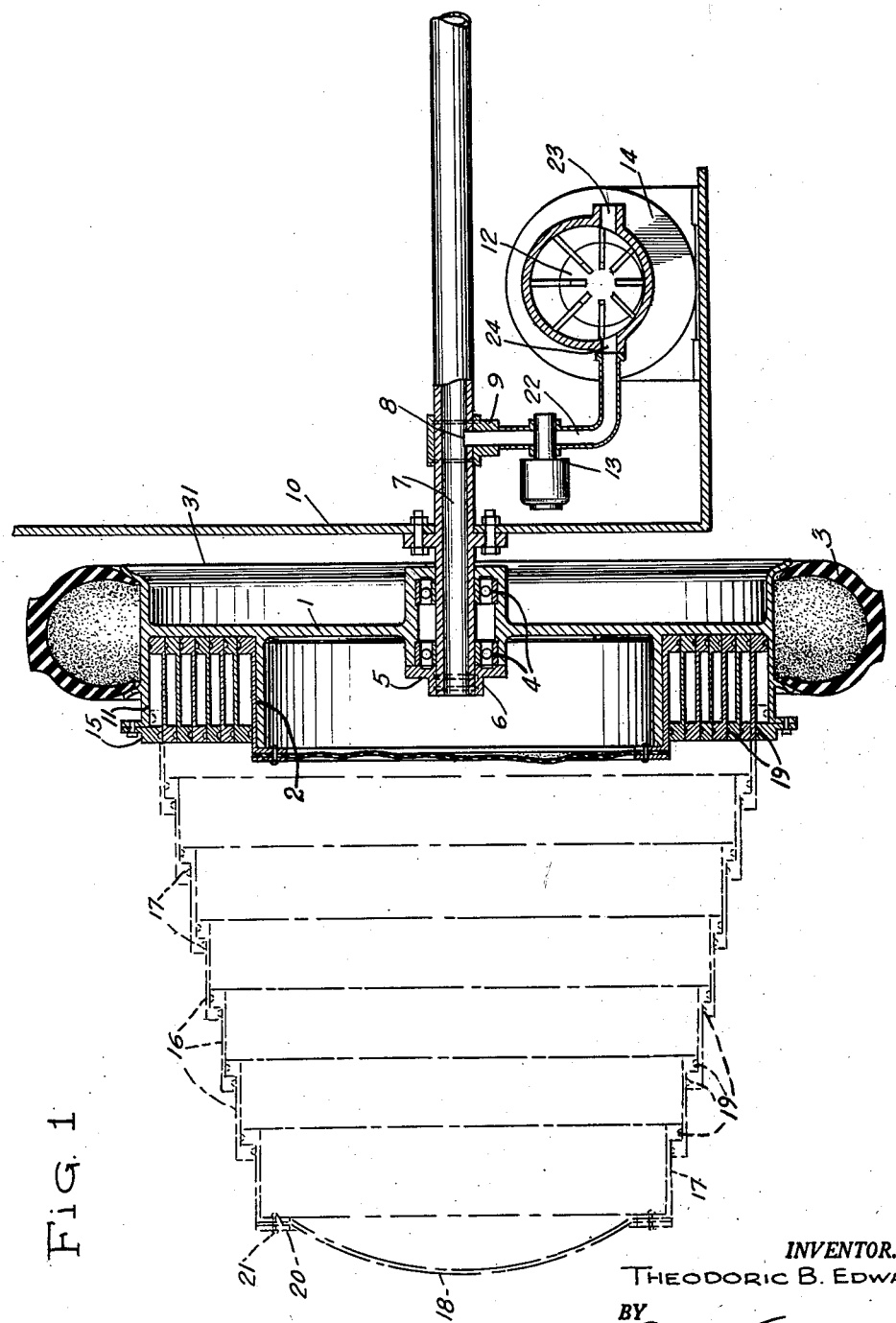

INVENTOR.
THEODORIC B. EDWARDS
BY
*George F. Waterman*
ATTORNEY

United States Patent Office 3,107,643
Patented Oct. 22, 1963

3,107,643
INFLATABLE WHEEL PONTOONS
Theodoric B. Edwards, 5311 Neptune Drive,
Alexandria, Va.
Filed June 8, 1962, Ser. No. 201,219
4 Claims. (Cl. 115—1)
(Granted under Title 35, U.S. Code (1952), sec. 266)

The invention described herein may be manufactured and used by or for the Government for governmental purposes without the payment to me of any royalty thereon.

This invention relates to inflatable pontoons for wheels of amphibious vehicles to steady the vehicle when negotiating water crossings.

One object of this invention is to provide a buoyant float for individual wheels of amphibious vehicles that can be inflated or deflated at the touch of a switch.

Another object of this invention is to design collapsible floats for wheeled amphibious vehicles with their internal pressure greater than atmospheric on the inflate cycle and less than atmospheric on the deflate cycle.

Heretofore, pontoons have been of the rigid hollow type similar to those used on seaplanes, or of the expandable, flexible walled type. The disadvantages of the solid type pontoon becomes apparent when the amphibious vehicle is traveling on land. Rigid walled pontoons take up a great deal of space when not in use even if they are disassembled and stored in the vehicle. Also, much time is wasted in attaching and removing such pontoons whenever a water crossing is made. Certain disadvantages are also inherent in the inflatable, flexible walled floats because these floats while they are easily collapsible and do not require a great amount of storage space, they are not rigid enough to provide support for the vehicle especially when extending beyond the sides of the vehicle.

In this invention pontoons for each wheel of an amphibious vehicle are constructed in such a way so as to avoid the disadvantage of the plain flexible walled type and the rigid metallic type pontoons. To give the pontoons both rigidity and quick collapsibility, the slidable sleeve structure is used. In this structure concentric telescoping sleeves are fitted inside one another with the larger outside sleeve fastened with an air tight seal to the rim of the wheel. Inside, this largest sleeve, is another sleeve of the same shape but smaller in diameter. A series of such sleeves are slidably mounted inside one another and the last or smallest sleeve is closed by a diaphragm across its end.

When pressure is applied internally to the pontoon, these telescoping sleeves slide into the inflated position forming a rigid hollow air tight enclosure. To collapse the pontoon, a vacuum is applied internally allowing the atmospheric pressure on the outside to push the sleeves into a compact nest. Air is pumped into and exhausted from the pontoon through the hollow axle by means of a reversible vane type rotary pump.

In conjunction with the reversible pump is a three way switch for its control. By moving the lever from the neutral position to the inflate position causes the pump to start in the forward direction forcing air through the hollow axle and into the pontoon. To deflate the pontoon the lever is moved to deflate position and this reverses the motor and makes the pump into a vacuum pump which forces the pontoon to collapse and fold up against the wheel and the air within the bellows or pontoons is exhausted to the atmosphere. The friction within the sleeves of the bellows would not let it collapse naturally, hence the need for vacuum collapsing.

Before the sliding sleeve structure can be designed for air tight collapsible enclosures, two factors must be considered. One is the stop to prevent the sleeves from completely falling out the end of one another and the other is the air tight seal. The stopping devices comprise an external flange about the circumference of each sleeve at its end nearest the wheel and an internal flange of the same shape at the opposite end of the sleeve. When the pontoon is inflated the internal flange of a sleeve engages with the external flange of the next smaller sleeve telescoped inside it thus forming a stop for the smaller sleeve. All sleeves are stopped the same way with coacting flange stops. Because of the sliding movement of the telescoping sleeves, a fixed seal cannot be used, but instead it is necessary to have a seal that is air tight in any position and while the sleeves are in motion upon inflating or collapsing the pontoons. Rubber O-ring seals are fitted in a recess in the center of the external flange of each sleeve. Similarly, O-ring seals are fitted into a circular recess in the center of the inside of the internal flange. Seals on the internal flanges are held in place by the sliding external cylindrical surface of the next smaller sleeves as air pressure is applied internally to the pontoon. The external flange of the smaller sleeve slides along the inside surface of the larger sleeve contacting it with the rubber seal.

The scope and details of the invention will become obvious upon further description in which:

FIG. 1 is a sectional view of one wheel mounted pontoon showing the pontoon when inflated in dotted outline and the pontoon when collapsed in solid lines;

Figure 3:
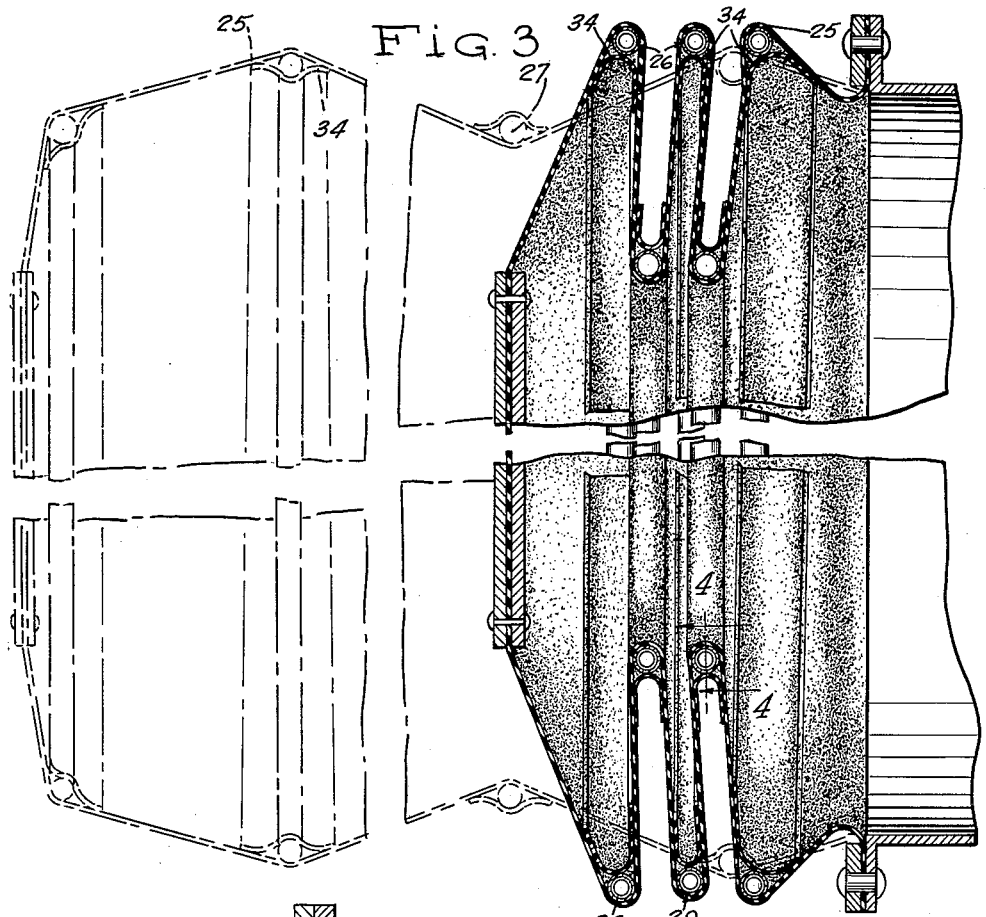
FIG. 3 shows another design of the bellows employing rubber sheeting; being shown in dotted outline for the inflated condition and in solid lines for the collapsed condition.

Referring to FIG. 1, a wheel 31 is mounted on a hollow axle 7 which in turn is mounted on the vehicle side wall 10. The telescoping sleeves 16 are free to move axially and have sealing rings 19 to prevent air leakage. The largest of the sleeves is mounted on the wheel with special ring 15. The wheel itself is free to rotate about the hollow axle on bearings 4 and is as close to vehicle side wall 10 of the vehicle as is feasible. Solid metal disc 1, holds the rim for a pneumatic tire 3 and is held onto the hollow axle with pins 6 fastened through axle 7 and end thrust plate 5. Two annular rings form the storage compartment for the sleeves in their collapsed position illustrated in solid lines in the drawing. The outer annular ring is an extension of rim 11, on the outside of the tire, while the inner ring 2 is welded to the wheel disc 1. The smallest sleeve 17 has a flexible diaphragm 18 fastened to the end flange 20 with pin 21.

Pump 12 with intake or exhaust port 23, driven by reversible motor 14, provides either a negative or positive pressure head to the hollow axle through port 24, pipe 22, and opening 8 in T joint 9, depending on which way the armature of motor 14 is rotating. When rotating in one direction, the pump acts as a blower, inflating the pontoon and when in the other direction it acts as a suction pump, collapsing the pontoon.

Solenoid operated valve 13 turns on the pump when the pressure in the pontoon drops below a particular value. Valve 13 is controlled by a three position switch having a neutral, an inflate, and a deflate position. While in its neutral position, it is pressure responsive in that when the pressure in the pontoons drops below a designated value as for example 3 p.s.i. the switch automatically snaps to the inflate position inflating the pontoons again to the 3 p.s.i. After reaching this pressure the switch returns to neutral. The reason for having the switch pressure responsive in its neutral position is to correct for small leakages in the pontoons. In order to deflate the pontoons the switch is moved over to its deflate position reversing motor 14 and converting pressure pump 12 into a vacuum pump.

Figure 2:
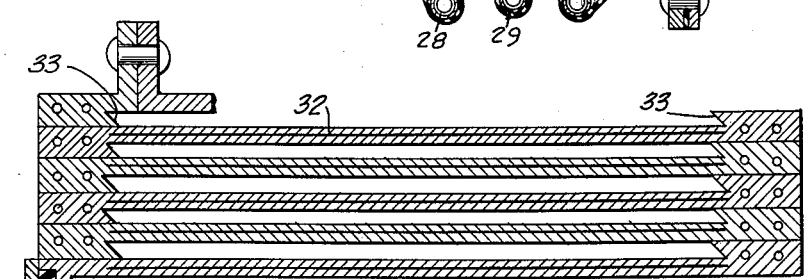
FIG. 2 is an alternate design of the bellows or telescoping sleeve.

FIG. 2 is a modification of the sleeve structure in the pontoons. Here, the same cylindrical sleeves are employed but they are constructed of molded rubber or plastic with a reinforcing layer 32 of metal, glass, or dacron cloth embedded in the rubber or plastic. Also, this modification differs from the original structure of the sleeves and instead of having rectangular coacting flanges, they have flanges with diagonal contacting surfaces 33. These diagonal surfaces mesh together when the pontoon is inflated forming a tight seal, as internal pressure is applied.

Another modification of the bellows or sleeves is shown in FIG. 3. Instead of a rigid sleeve construction as in FIGS. 1 and 2 the bellows are made of flexible rubber sheeting 25. If rubber sheeting 25 alone were used the pontoons could not stand the vertical force caused by their buoyancy as the amphibious vehicle enters the water. To strengthen the bellows so they will survive such force, alternate retaining rings 26, and garter springs 27, are fixed along the circumstance of the pontoon. The retaining rings being larger than the garter springs are fixed at intervals along the inside of the bellows with short strips of rubber 34. Between each retaining ring is a garter spring smaller in diameter similarly fastened to the outside of the pontoon. With the bellows in the inflated position these retaining rings and garter springs hold the surface of the bellows in a zig-zag fashion strengthening them to sufficiently withstand the buoyant force without buckling over.

Figure 4:
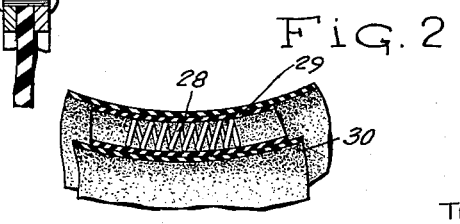
FIG. 4 is a sectional view of the garter spring.

As shown in FIG. 4, the garter spring is an expansion coil spring 28 encircling the pontoon forming an endless garter to strengthen the pontoon. So that the spring can expand and contract without pinching the rubber sheeting it is enclosed in a rubber tube 29. Both the spring 28 and the rubber tube 29 are held from sliding along the pontoon by rubber strip 30 fastened to the rubber sheeting.

I claim:
1. An inflatable wheel pontoon construction for attachment to a wheel of an amphibious wheeled vehicle comprising:
    (a) an expandable cylindrical air tight chamber including means for securing said chamber to the outside of a vehicle wheel;
    (b) a reversible valve and pump with driving means to selectively expand and evacuate said chamber;
    (c) means carried by the amphibious vehicle mounting the wheels thereof and coupling the expandible chamber to said reversible pump; and
    (d) a hollow axle means on the amphibious vehicle coupling the expandable chamber to the reversible pump for both ends of said axle.
2. An inflatable wheel pontoon construction for attachment to a wheel of an amphibious wheeled vehicle comprising:
    (a) an expandable air chamber formed by a series of cylindrical telescoping sleeves slidably mounted inside one another, the smallest of said sleeves being sealed shut by an air tight diaphragm across its end, the largest of said sleeves being affixed to the outside rim of a wheel, the said series of sleeves having air tight seals and slide stopping means at each telescoping joint;
    (b) a reversible valve and air pump with driving means for selectively filling and evacuating said expandable air chamber;
    (c) means on the amphibious vehicle for carrying air between the expandable chamber and the reversible pump; and
    (d) a hollow axle on the amphibious vehicle coupling by rotatable sealing means the expandable chamber to the reversible pump for both ends of said axle.
3. Individual wheel pontoons for an amphibious vehicle comprising:
    (a) an air tight chamber closed by a diaphragm on one end and secured to the wheel of the vehicle at the other, said chamber being formed by telescoping cylinders of a reinforced plastic material each cylinder having an internal annular flange at one end and an external annular flange at the other end, said flanges having abutting surfaces angularly disposed to the telescoping axis, and O-ring seals fitted within grooves about the circumference of each internal and external flange;
    (b) a reversible valve and pump with driving means therefor to selectively expand and evacuate said chamber;
    (c) a hollow axle on the amphibious vehicle coupling the expandable chamber to the reversible pump; and
    (d) a horizontal axle means on the amphibious vehicle coupling by rotatable sealing means the expandable chamber to the reversible pump for both ends of said axle.
4. Individual wheel pontoons for an amphibious vehicle comprising:
    (a) a cylindrical, selectively expandable and collapsible air tight chamber made of flexible rubber sheeting, one end being closed and the other end being sealed to the outside of a vehicle wheel;
    (b) alternate retaining rings and spring means about the circumference of said flexible rubber chamber at predetermined spaced intervals thereof with said springs being smaller in diameter than said retaining rings when said chamber is in a collapsed condition;
    (c) a reversible pump and driving means to selectively expand and evacuate said chamber; and
    (d) a hollow axle on the amphibious vehicle coupling the expandable chamber to the reversible pump.

References Cited in the file of this patent
UNITED STATES PATENTS

| | | |
|---|---|---|
| 2,546,956 | Yeomans | Mar. 27, 1951 |
| 2,751,959 | Blomquist | June 26, 1956 |
| 2,998,996 | Aghnides | Sept. 5, 1961 |